US012140822B2

(12) United States Patent
Nilsson et al.

(10) Patent No.: US 12,140,822 B2
(45) Date of Patent: Nov. 12, 2024

(54) CONTROLLING AN INTERNAL LIGHT SOURCE OF A VEHICLE FOR DARKENING OF GLASSES

(71) Applicant: Ningbo Geely Automobile Research & Development Co., Ltd., Ningbo (CN)

(72) Inventors: Magnus Nilsson, Floda (SE); Jonathan Johansson, Gothenburg (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 107 days.

(21) Appl. No.: 17/555,412

(22) Filed: Dec. 18, 2021

(65) Prior Publication Data

US 2022/0114816 A1 Apr. 14, 2022

Related U.S. Application Data

(63) Continuation of application No. PCT/CN2020/103860, filed on Jul. 23, 2020.

(30) Foreign Application Priority Data

Aug. 21, 2019 (EP) .................................... 19192964

(51) Int. Cl.
*B60Q 3/12* (2017.01)
*G02F 1/01* (2006.01)
(Continued)

(52) U.S. Cl.
CPC ............ *G02F 1/0126* (2013.01); *G06V 20/59* (2022.01); *H05B 47/125* (2020.01)

(58) Field of Classification Search
CPC .. H05B 45/115; H05B 45/125; H05B 47/115; H05B 47/125; B60Q 1/249; B60Q 3/12;
(Continued)

(56) References Cited

U.S. PATENT DOCUMENTS 7,971,172 B1 6/2011 Hendrickson
2003/0209893 A1* 11/2003 Breed ............... B60R 21/01554
701/45
(Continued)

FOREIGN PATENT DOCUMENTS

CN 103077370 A 5/2013

OTHER PUBLICATIONS

International Search Report from corresponding International Application No. PCT/CN2020/103860, mailed on Oct. 16, 2020, 2 pages.
(Continued)

*Primary Examiner* — Tung X Le
(74) *Attorney, Agent, or Firm* — Tucker Ellis LLP

(57) ABSTRACT

A method for controlling an internal light source of a vehicle, wherein the internal light source is for darkening of glasses. The method includes acquiring an image recognition result, wherein the image recognition is for determining whether an occupant of the vehicle wears glasses, and controlling the light source responsive to the acquired image recognition result. In some embodiments, controlling the light source includes activating the light source when the image recognition result indicates that the occupant wears glasses. In some embodiments, the image recognition result is indicative of whether glasses darken responsive to activation of the light source and controlling the light source comprises deactivating the light source when the image recognition result indicates that the glasses do not darken responsive to activation of the light source.

11 Claims, 3 Drawing Sheets

(51) Int. Cl.
*G06V 20/59* (2022.01)
*H05B 47/10* (2020.01)
*H05B 47/125* (2020.01)

(58) Field of Classification Search
CPC ... B60Q 3/14; B60Q 3/20; B60Q 3/51; B60Q 3/70
See application file for complete search history.

(56) References Cited

U.S. PATENT DOCUMENTS

| | | | | |
|---|---|---|---|---|
| 2009/0317773 | A1* | 12/2009 | Chapman | G09B 9/30 349/13 |
| 2013/0222642 | A1* | 8/2013 | Watanabe | H04N 23/611 348/234 |
| 2014/0184496 | A1* | 7/2014 | Gribetz | G06F 3/0482 345/156 |
| 2014/0362428 | A1 | 12/2014 | Chen | |
| 2015/0062469 | A1 | 3/2015 | Fleury | |
| 2019/0096340 | A1* | 3/2019 | Todd | G09G 3/36 |
| 2020/0059998 | A1* | 2/2020 | Spurr | H05B 45/37 |

OTHER PUBLICATIONS

Sang-Min Park et al: "Study of wearing sunglasses driver drowsiness state monitoring", Proceedings of HCI Korea 2016, 5 pages.
European Search Report from corresponding European Application No. 19192964, mailed on Jan. 29, 2020, 8 pages.

\* cited by examiner

CONTROLLING AN INTERNAL LIGHT SOURCE OF A VEHICLE FOR DARKENING OF GLASSES

RELATED APPLICATION DATA

This application is a continuation of International Patent Application No. PCT/CN2020/103860, filed Jul. 23, 2020, which claims the benefit of European Patent Application No. 19192964.5, filed Aug. 21, 2019, the disclosures of which are incorporated herein by reference in their entireties.

TECHNICAL FIELD

The present disclosure relates generally to the field of controlling light sources. More particularly, it relates to controlling light sources for darkening of glasses.

BACKGROUND

Glasses that darkens when exposed to light of one or more certain wavelength may have the disadvantage that they do not darken when worn inside a vehicle if windows of the vehicle blocks (or lowers the intensity of) the certain wavelength.

One example is photo-chromatic glasses that darken when exposed to ultra-violet (UV) light since UV light is often blocked (at least partly) by the windshield and other windows of a car.

This may be problematic when light of visible wavelengths is not blocked to the same extent as the UV light, since such visible light may be disturbing to the wearer of the glasses.

US20140362428A1 provides an approach to reversibly activating photo-chromatic materials within an enclosed vehicle using one or more UV sources located within the interior of the vehicle. Upon activation, such UV sources cause the photo-chromatic materials to darken; upon deactivation, the photo-chromatic materials revert to their clear state. The UV light sources may be switched on or off through the use of a switch, or automatically modulated in response to ambient light conditions.

However, there is a need for additional, alternative, and/or improved approaches to controlling light sources for darkening of glasses.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement or system is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the disadvantages described herein, and/or other disadvantages.

It is an object of some embodiments to improve the control of light sources for darkening of glasses.

It is an object of some embodiments to avoid the need for manual activation/deactivation of the light sources.

It is an object of some embodiments to provide light source operation that is customized to a current scenario of the vehicle interior. For example, a current scenario of the vehicle interior may be specified by one or more of: whether occupants wear glasses, whether the glasses are darkening glasses, the location of glasses-wearing occupants, user preferences of glasses-wearing occupants, and optimal light wavelengths for darkening.

One or more of these, or other, objects are achieved by the following aspects and embodiments.

A first aspect is a method for controlling an internal light source of a vehicle, wherein the internal light source is for darkening of glasses. The method comprises acquiring an image recognition result, wherein the image recognition is for determining whether an occupant of the vehicle wears glasses, and controlling the light source responsive to the acquired image recognition result.

An advantage of the first aspect is that control of light sources for darkening of glasses in a vehicle is improved.

Another advantage of the first aspect is that the need for manual activation/deactivation of the light sources is avoided.

In some embodiments, the internal light source is for darkening of photo-chromatic glasses and/or the image recognition is for determining whether an occupant of the vehicle wears photo-chromatic glasses.

An advantage of these embodiments, is that the control of light sources for darkening of glasses is specifically adapted for photo-chromatic glasses.

In some embodiments, controlling the light source comprises deactivating the light source when the image recognition result indicates that the occupant wears no glasses, and/or activating the light source when the image recognition result indicates that the occupant wears glasses.

Thus, light source operation is customized to a current scenario of the vehicle interior, wherein the current scenario of the vehicle interior is specified by whether occupants wear glasses.

An advantage of these embodiments is that the light source is not activated when there are no occupants wearing glasses. These embodiments may entail the benefit that occupants are not unnecessarily exposed to light from the light sources. Alternatively or additionally, these embodiments may entail the benefit that the energy consumption of the light sources is controlled, e.g., such that energy is not unnecessarily consumed.

Generally, when energy consumption is mentioned herein, it should be understood that the associated problems, features, and/or advantages may, alternatively or additionally, be equally relevant for power consumption.

In some embodiments, the image recognition result is indicative of whether glasses darken responsive to activation of the light source.

In some embodiments, controlling the light source comprises deactivating the light source when the image recognition result indicates that the glasses do not darken responsive to activation of the light source.

Thus, light source operation is customized to a current scenario of the vehicle interior, wherein the current scenario of the vehicle interior is specified by whether the glasses are darkening glasses.

An advantage of these embodiments is that the light source is deactivated when detected glasses do not darken in response to activation of the light sources. These embodiments may entail the benefit that occupants are not unnecessarily exposed to light from the light sources. Alternatively or additionally, these embodiments may entail the benefit that the energy consumption of the light sources is controlled, e.g., such that energy is not unnecessarily consumed.

In some embodiments, the light source comprises a plurality of light sources having different wavelength profiles. In such embodiments, activation of the light source may comprise consecutively activating the plurality of light sources, one at a time, and controlling the light source may comprise selecting one light source of the plurality of light sources, for which the image recognition result indicates that the glasses darken responsive to activation, and deactivating non-selected light sources of the plurality of light sources.

Thus, light source operation is customized to a current scenario of the vehicle interior, wherein the current scenario of the vehicle interior is specified by optimal light wavelengths for darkening.

An advantage of these embodiments is that the light source is configured to use a light wavelength which is particularly suitable for darkening of the glasses worn by vehicle occupants. These embodiments may entail the benefit that darkening of glasses is improved compared to when non-customized wavelength(s) is used.

In some embodiments, the image recognition result is indicative of a darkening degree of glasses.

In some embodiments, controlling the light source comprises limiting an intensity of the light source to a value corresponding to a specified darkening degree.

An advantage of these embodiments is that the light source does not use a higher light intensity than required to achieve the specified darkening degree. These embodiments may entail the benefit that the energy consumption of the light sources is controlled, e.g., such that energy is not unnecessarily consumed. Alternatively or additionally, these embodiments may entail the benefit that a user preference regarding darkening degree may be met.

In some embodiments, the image recognition is indicative of an identity of the occupant and wherein controlling the light source is based on a glasses-related user profile associated with the identity of the occupant.

Thus, light source operation is customized to a current scenario of the vehicle interior, wherein the current scenario of the vehicle interior is specified by user preferences of glasses-wearing occupants.

These embodiments may entail the benefit that user preferences regarding darkening of glasses may be met. Alternatively or additionally, these embodiments may entail the benefit that one or more pairs of glasses of an occupant may be registered with corresponding characteristics (e.g., whether they are darkening glasses, darkening wavelength(s), light intensity for specified darkening degree, etc.), thereby avoiding performing tests to determine such features every time a vehicle occupant is detected.

In some embodiments, the method further comprises directing the light source towards a face of a glasses-wearing occupant of the vehicle.

Thus, light source operation is customized to a current scenario of the vehicle interior, wherein the current scenario of the vehicle interior is specified by the location of glasses-wearing occupants.

These embodiments may entail the benefit that occupants are not unnecessarily exposed to light from the light sources. Alternatively or additionally, these embodiments may entail the benefit that the energy consumption of the light sources is controlled, e.g., such that energy is not unnecessarily consumed, since light is not emitted in directions where it is not needed for darkening of glasses.

A second aspect is a computer program comprising program instructions. The computer program is loadable into a data processing unit and is configured to cause execution of the method according to the first aspect when the computer program is run by the data processing unit.

Advantages of the second aspect may include any of the advantages of the first aspect. Furthermore, an advantage of the second aspect is that a vehicle or a glasses-darkening system may be configured to apply the method of the first aspect.

A third aspect is a computer program product comprising a computer readable medium carrying a computer program comprising program instructions. The computer program is loadable into a data processing unit and configured to cause execution of the method according to the first aspect when the computer program is run by the data processing unit.

Advantages of the third aspect may include any of the advantages of the first aspect. Furthermore, an advantage of the third aspect is that a vehicle or a glasses-darkening system may be configured to apply the method of the first aspect.

A fourth aspect is a control unit for an internal light source of a vehicle, wherein the internal light source is for darkening of glasses. The control unit is configured to cause execution of the method according to the first aspect.

Advantages of the fourth aspect may include any of the advantages of the first aspect. Furthermore, an advantage of the fourth aspect is that a vehicle or a glasses-darkening system may be configured to apply the method of the first aspect.

A fifth aspect is an apparatus for controlling an internal light source of a vehicle, wherein the internal light source is for darkening of glasses. The apparatus comprises controlling circuitry configured to cause acquisition of an image recognition result, wherein the image recognition is for determining whether an occupant of the vehicle wears glasses, and control of the light source responsive to the acquired image recognition result.

Advantages of the fifth aspect may include any of the advantages of the first aspect. Furthermore, an advantage of the fifth aspect is that a vehicle or a glasses-darkening system may be configured to apply the method of the first aspect.

A sixth aspect is a system for darkening of glasses in a vehicle. The system comprises an image sensor configured for internal mounting in an occupant space of the vehicle, and an image processor configured to perform image recognition for images provided by the image sensor, wherein the image recognition is for determining whether an occupant of the vehicle wears glasses. The system also comprises a light source for darkening of glasses, the light source being configured for internal mounting in the occupant space of the vehicle, and a controller configured to control the light source responsive to an image recognition result provided by the image processor.

Advantages of the sixth aspect may include any of the advantages of the first aspect. Furthermore, an advantage of the sixth aspect is that a complete system is provided for installation in a vehicle.

A seventh aspect is a vehicle comprising one or more of the control unit of the forth aspect, the apparatus of the fifth aspect, and the system of the sixth aspect.

Advantages of the seventh aspect may include any of the advantages of the first aspect. Furthermore, an advantage of the seventh aspect is that a system for darkening of glasses is provided in a vehicle.

In some embodiments, any of the above aspects may additionally have features identical with or corresponding to any of the various features as explained above for any of the other aspects.

Generally, advantages of some embodiments may include one or more of the following:
   that control of light sources for darkening of glasses in a vehicle is improved,
   that the need for manual activation/deactivation of the light sources is avoided,
   that light source operation is provided which is customized to a current scenario of the vehicle interior, and
   that energy consumption may be decreased compared to other approaches for darkening of glasses.

Further objects, features and advantages will become apparent when studying the appended claims and the following description, with reference being made to the accompanying drawings.

The person skilled in the art realizes that different features of different embodiments may be combined to create embodiments other than those described herein, without departing from the scope of the invention.

BRIEF DESCRIPTION OF THE DRAWINGS

With reference to the appended drawings, below follows a more detailed description of example embodiments. The drawings are not necessarily to scale, emphasis instead being placed upon illustrating the example embodiments.

DETAILED DESCRIPTION

Figure 1:
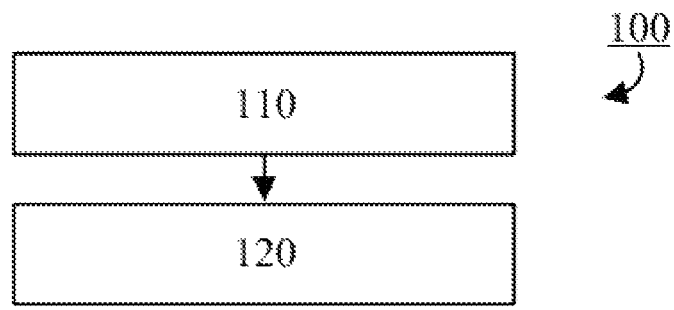
FIG. 1 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

The approach of US20140362428A1, wherein it is suggested to reversibly activate photo-chromatic materials within an enclosed vehicle using one or more UV sources located within the interior of the vehicle, has several problems. One problem is that the control of UV light sources is limited to the two examples of switching on and off through the use of a switch, and automatically modulating in response to ambient light conditions. It would be more convenient if the control of UV light sources could be automated to avoid the necessity of user interaction. It would also be convenient if automatic modulation could be more elaborate than only responding to ambient light conditions, e.g., such that the UV light sources are only used when needed. Furthermore, it would be beneficial if the energy consumption of the UV light sources could be decreased.

In the following, embodiments will be described where image recognition for determining whether an occupant of a vehicle wears glasses is used to control an internal light source of a vehicle for darkening of glasses.

The light source control may, or may not, be combined with manual enabling/disabling and/or with control (enabling/disabling and/or controlling the light intensity) depending on the ambient light. The ambient light may, for example, be measured by one or more light sensors mounted at the exterior of the vehicle.

Control of the light source may, for example, include one or more of enabling/disabling the light source, controlling the light intensity of the light source, controlling the wavelength of the light emitted by the light source, and controlling the direction of light emitted by the light source.

Generally, the light source may be an UV light source and/or a light source configured to emit light of other wavelength(s) than UV light. Typically, the light source is configured to emit light of at least one wavelength comprised in sunlight and blocked, or at least attenuated, by one or more windows of the vehicle.

Also generally, the light source may be any suitable light source, e.g., a ramp of light emitting diodes (LED).

Generally, the image recognition may be implemented using any suitable, known or future technique. For example, one or more image sensors (e.g., a camera) may be used to capture one or more images of the interior of the vehicle, and an image processor may be used to perform image recognition based on captured images provided by the image sensor(s).

Typically, the image processor may be configured to recognize faces wearing glasses in the images, and possibly determine a location within the vehicle of such faces. Furthermore, the image processor may be configured to determine whether glasses darkens (decreasing transparency) over a time duration according to various embodiments, e.g., by comparing two or more consecutive images and/or by comparing a skin tone of the face wearing glasses to a skin tone as seen through the glasses.

FIG. 1 illustrates an example method 100 according to some embodiments, for controlling an internal light source of a vehicle for darkening of glasses.

In step 110, an image recognition result is acquired, wherein the image recognition is for determining whether an occupant of the vehicle wears glasses. Acquiring the image recognition result may, for example, comprise receiving a signal indicative of the image recognition result, retreating the image recognition result from a storage module, or determining the image recognition result (e.g., by an image processor).

In step 120, the light source is controlled responsive to the acquired image recognition result. The light may, in some embodiments, be additionally controlled based on manual interaction (e.g., enabling/disabling manually) and/or based on acquired indication(s) of ambient light intensity (e.g., from external light sensors).

The control of the light source may be in relation to one or more specific occupant position(s) (e.g., a driver) of the vehicle, or in relation to all occupant positions of the vehicle.

When the image recognition result is indicative of whether the occupant of the vehicle wears glasses, step 120 may comprise deactivating the light source when the image recognition result indicates that none of the considered occupants wear glasses and activating the light source when the image recognition result indicates that at least one of the considered occupants wear glasses.

When the image recognition result is indicative of whether glasses darken responsive to activation of the light source, step 120 may comprise deactivating the light source when the image recognition result indicates that none of the glasses of the considered occupants darken responsive to activation of the light source.

In some implementations, the light source may comprise a plurality of light sources having different wavelength profiles (or a light source capable of selectively emitting a plurality of different wavelength profiles). Each wavelength profile may comprise one wavelength only, or a spectrum of wavelengths. In such embodiments, step 120 may comprise activating the plurality of light sources (or more generally, the different wavelength profiles) consecutively, one at a time, and selecting one light source (or more generally, one wavelength profile) for which the image recognition result indicates that the glasses darken responsive to activation. For example, the wavelength profile that is associated with the most prominent darkening may be selected. When several occupant positions are considered, several wavelength profiles may be selected, as applicable. The selected wavelength profile(s) may be kept in activated state to keep glasses darkened, and the non-selected wavelength profile(s) may be deactivated.

In some embodiments, the image recognition result is indicative of a darkening degree of glasses (e.g., in terms of transparency). The transparency may be determined, for example, by comparing a skin tone of the face wearing glasses to a skin tone as seen through the glasses. In these embodiments, step 120 may comprise limiting the intensity of the light source to a value corresponding to a specified darkening degree.

For example, the specified darkening degree may be a maximum darkening degree of glasses. The maximum darkening degree may, e.g., be determined by exposing the glasses to different light intensities and determining at what intensity the darkening saturates. That intensity may then be used for darkening. Alternatively or additionally, the maximum darkening degree may be available (directly or via an associated light intensity) from an occupant user profile and/or from product information for the glasses.

Alternatively or additionally, the specified darkening degree may be associated with a pupil dilation criterion (e.g., defined in terms of a relation between an area of the pupil and an area of the iris). The pupil dilation may, for example, be determined via infra-red measurements. The pupil dilation may, e.g., be determined for different light intensity exposures and the intensity that fulfills the pupil dilation criterion may then be used for darkening. Alternatively or additionally, the specified darkening degree may be available (directly or via an associated light intensity) from an occupant user profile.

Yet alternatively or additionally, the specified darkening degree may be specified by a user and available (directly or via an associated light intensity) from an occupant user profile.

Generally, when an occupant user profile is available, it may comprise one or more glasses associated with the occupant, as well as suitable characteristics of each pair of glasses (e.g., whether they are darkening glasses, darkening wavelength(s), light intensity for specified darkening degree, etc.).

The occupant user profile may be created/updated using any suitable approach. For example, one or more of the above approaches of determining whether glasses darken, which wavelength(s) are suitable for darkening them, and maximum darkening degree may be performed and the result may be saved in the user profile in association with glasses identification (e.g., shape, color, digital identifier, brand, model, etc.). Alternatively or additionally, the occupant user profile may be created/updated responsive to user input (e.g., specifying whether glasses darken, selecting a preferred darkening degree, etc.).

The occupant user profile may be activated active selection on a user interface, or automatically via the image recognition. When the image recognition is indicative of an identity of the occupant, step 120 may comprise controlling the light source is based on a glasses-related user profile associated with the identity of the occupant.

Additionally or alternatively to applying an occupant user profile, the image recognition may, in some embodiments, comprise recognizing brand/model of the glasses (based on, e.g., determined shape, a digital identifier, mapping to a table of brands/models, mapping to product information on the Internet, etc.). For such embodiments, the method may comprise retreating information (e.g., from the Internet, from a dedicated database, etc.) regarding darkening properties of the glasses (e.g., whether they are darkening, light intensity suitable for darkening, optimal wavelengths for darkening, etc.), and using it in step 120.

In some embodiments, step 120 may further comprise directing the light source towards a face of a glasses-wearing occupant of the vehicle. This may, for example, be achieved by directable light sources (e.g., movable or equipped with a movable reflector), or by several light sources pointing in different directions. When several occupants wear glasses, directing may be to all of them, or to one or more prioritized occupants (e.g., driver, front seat passenger, occupant with priority specified in user profile, etc.).

Generally, darkening glasses may apply any suitable darkening technique that respond to light exposure. A typical example is photo-chromatic glasses. Other examples include electromechanical and/or mechanical solutions for darkening that are activated by light exposure (e.g., via signal reception from a light sensor).

Figure 2:
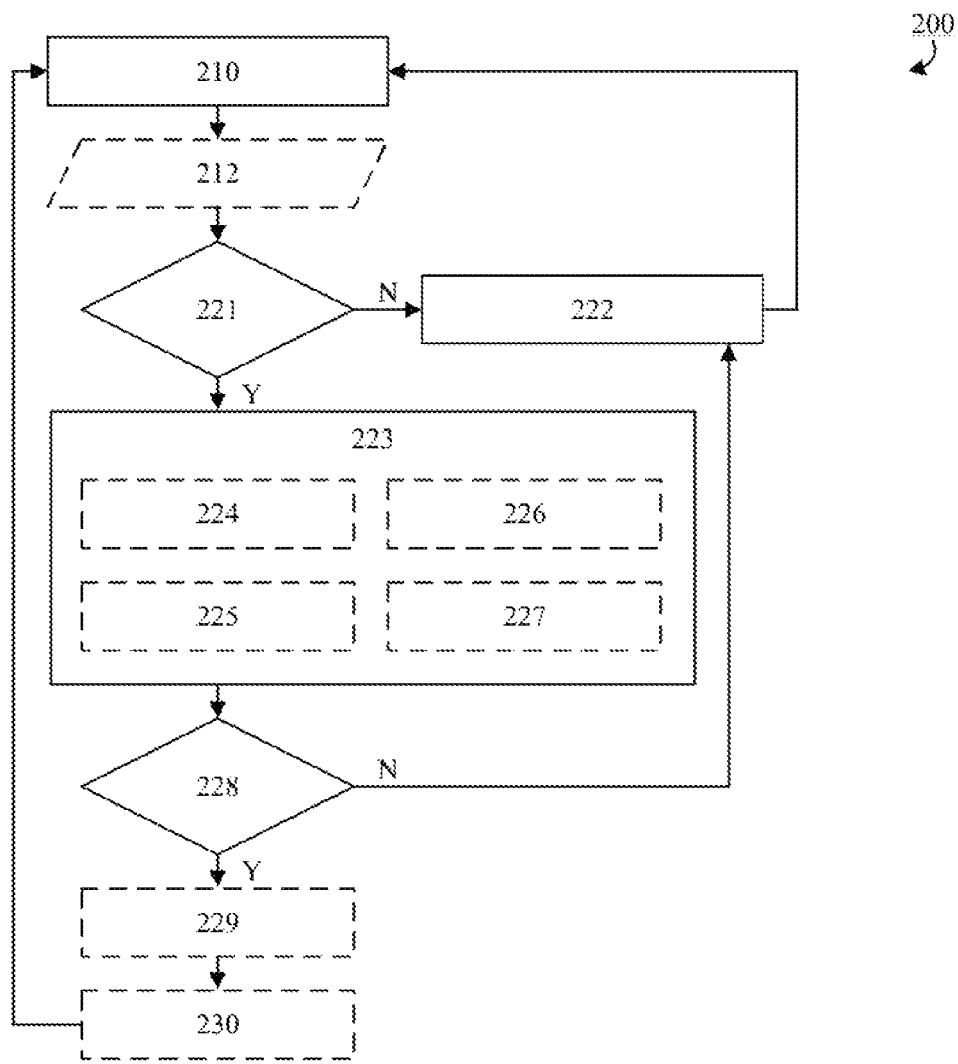
FIG. 2 is a flowchart illustrating example method steps according to some embodiments.

FIG. 2 illustrates an example method 200 for controlling an internal light source of a vehicle, wherein the internal light source is for darkening of glasses. The method 200 may be seen as an exemplification of the method 100 of FIG. 1.

An image recognition result is acquired in step 210 (compare with step 110 of FIG. 1), wherein the image recognition is for determining whether an occupant of the vehicle wears glasses.

The steps following on step 110 may be performed in relation to one or more specific occupant position(s) of the vehicle, or in relation to all occupant positions of the vehicle. This is represented by optional step 212 in FIG. 2. Step 212 may, for example, require that one or more of steps 221-230 is performed for each of one or more occupant position(s).

In step 221, it is determined, based on the acquired image recognition result, whether an occupant of the vehicle wears glasses.

If it is determined that no occupant (at the considered position) wears glasses—N-path out of step 221—the light source is deactivated in step 222, and the method returns to step 210 to acquire a new image recognition result.

Generally, the method may be repeated (starting by acquiring a new image recognition result) at regular time intervals, and/or as triggered by an event (e.g., starting the vehicle, closing a door of the vehicle, detecting increasing ambient light intensity, changing position of a windshield visor, etc.).

If it is determined that an occupant (at the considered position) wears glasses—Y-path out of step 221—the light source is activated in step 223.

The activation of step 223 may be based on a glasses-related user profile associated with the identity of the occupant as illustrated by optional sub-step 224. When the image recognition is indicative of an identity of the occupant, this identity may be used to address a database to retrieve characteristics of glasses associated with the identity, and the activation may be based on such characteristics, as exemplified in relation to FIG. 1.

The activation of step 223 may comprise directing the light source towards a face of a glasses-wearing occupant of the vehicle, as illustrated by optional sub-step 225 and exemplified in relation to FIG. 1.

If the light source is capable of emitting different wavelength profiles, the activation of step 223 may comprise consecutively activating the plurality of light sources, one at a time, as illustrated by optional sub-step 226.

Optional sub-step 227 comprises selecting a wavelength profile for which the glasses darken responsive to activation. The selection of 227 may be based on the result of 226 and/or based on an occupant user profile. The selected wavelength profile is then used for darkening, and non-selected wavelength profiles may be deactivated.

In step 228, it is determined from the image recognition result whether the glasses under consideration darken responsive to activation of the light source in step 223.

If it is determined that the glasses does not darken—N-path out of step 223—the light source is deactivated in step 222, and the method returns to step 210 to acquire a new image recognition result.

If it is determined that the glasses darkens—Y-path out of step 223—the light source is kept activated.

In optional step 229, the intensity of the light source may be set. For example, limiting the intensity of the light source to a value corresponding to a specified darkening degree, as exemplified in relation to FIG. 1.

In optional step 230, any information acquired by performance of the earlier method steps may be saved to a (new or updated) occupant user profile. The occupant user profile may be selected via a user interface or may be automatically selected based on an identity detection of the image recognition.

It should be understood that numerous variations of the examples described in connection to FIGS. 1 and 2 are possible without departing from the scope of the claims.

One variation relates to that the light intensity of the light source may be additionally controlled based on ambient light conditions (e.g., different ambient light intensity and/or wavelength spectrum; typically depending on weather conditions). For example, a vehicle occupant may prefer glasses being less darkened when it is cloudy outside.

For this variant, the method may comprise acquiring information regarding ambient light conditions (e.g., receiving such information) and controlling the light source further responsive to the acquired information regarding ambient light conditions. User preferences relating to ambient light conditions may optionally be stored in the occupant user profile according to some embodiments.

Figure 3:
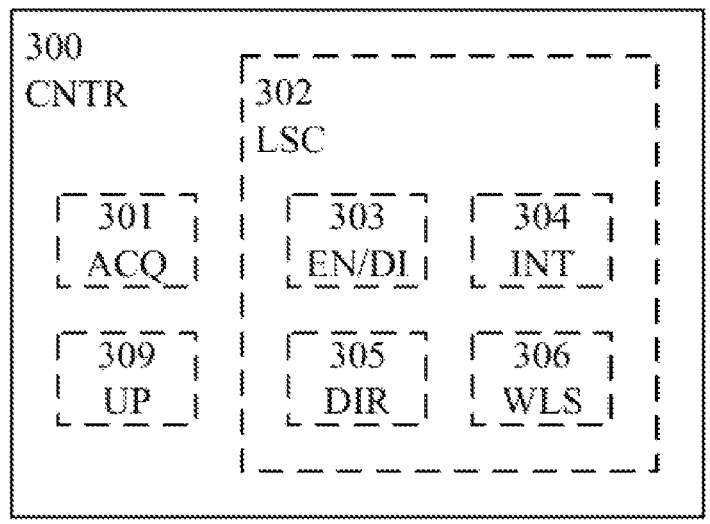
FIG. 3 is a schematic block diagram illustrating an example controller according to some embodiments.

FIG. 3 schematically illustrates an example controller (CNTR; e.g., control circuitry, a control device, a control module, or a control unit) 300 according to some embodiments. The controller 300 may, for example, be configured to cause execution of (e.g., may be configured to perform) one or more of the method steps described in connection to FIGS. 1 and/or 2, or otherwise described herein. The controller 300 may be comprised in an apparatus according to some embodiments. The controller 300 (and/or the apparatus comprising it) is for controlling an internal light source of a vehicle, wherein the internal light source is for darkening of glasses.

The controller is configured to cause acquisition of an image recognition result, wherein the image recognition is for determining whether an occupant of the vehicle wears glasses (compare with step 110 of FIG. 1 and step 210 of FIG. 2).

To this end, the controller may comprise an acquirer (ACQ; e.g., acquisition circuitry or an acquisition module) 301. The acquirer may be configured to acquire the image recognition result. The acquirer may, for example, comprise an interface or a receiver configured to receive a signal indicative of the image recognition result from an image processor. Alternatively or additionally, the acquirer may comprise an image processor configured to determine the image recognition result.

The controller is also configured to cause control of the light source responsive to the acquired image recognition result (compare with step 120 of FIG. 1 and steps 221-229 of FIG. 2).

To this end, the controller may comprise a light source controller (LSC; e.g., light source control circuitry or a light source control module) 302. The light source controller may be configured to control of the light source responsive to the acquired image recognition result.

In some embodiments, the light source controller comprises an enabler/disabler (EN/DI) 303 configured to cause (e.g., configured to perform) deactivation of the light source when the image recognition result indicates that the occupant wears no glasses, and activation of the light source when the image recognition result indicates that the occupant wears glasses (compare with steps 221, 222, 223 of FIG. 2). Alternatively or additionally, the enabler/disabler 303 may be configured to cause (e.g., configured to perform) deactivation of the light source when the image recognition result indicates that the glasses do not darken responsive to activation of the light source (compare with steps 228, 222 of FIG. 2).

In some embodiments, the light source controller comprises a wavelength selector (WLS) 306 configured to cause (e.g., configured to perform) selection of one of a plurality of wavelength profiles and deactivation of non-selected wavelength profiles (compare with steps 226, 227 of FIG. 2).

In some embodiments, the light source controller comprises an intensity controller (INT) 304 configured to cause (e.g., configured to perform) control the intensity of the light source; e.g., limiting the intensity to a value corresponding to a specified darkening degree (compare with step 229 of FIG. 2).

In some embodiments, the light source controller comprises a direction controller (DIR) 305 configured to cause (e.g., configured to perform) directing of the light source towards a face of a glasses-wearing occupant of the vehicle (compare with step 225 of FIG. 2).

In some embodiments, the controller 300 may further comprise, or be otherwise associated with, a user profile storage (UP) 309, configured to store a user profile for each of one or more possible vehicle occupants. Then, the controller 300 may be configured to controlling the light source based on glasses-related information of the user profile associated with the identity of the occupant (compare with step 224 of FIG. 2).

Figure 4:
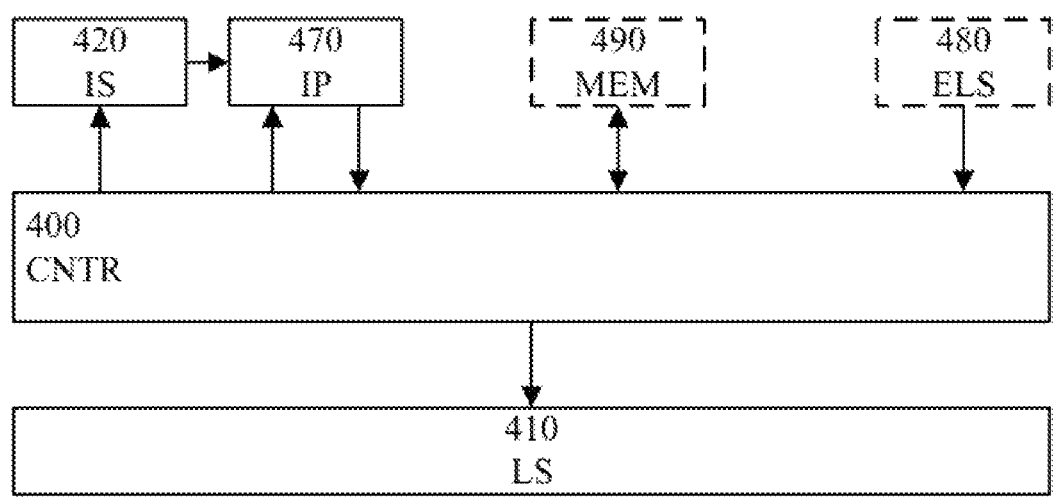
FIG. 4 is a schematic block diagram illustrating an example system according to some embodiments.

FIG. 4 schematically illustrates an example system for darkening of glasses according to some embodiments. The system may, for example, be configured to perform one or more of the method steps described in connection to FIGS. 1 and/or 2, or otherwise described herein. The system may be comprised in, or may be mountable in, a vehicle.

The system comprises a light source (LS; e.g., one or more light sources such as LEDs) 410, an image sensor (IS; e.g., image sensing circuitry, a camera, etc.) 420, an image processor (IP; e.g., image processing circuitry or an image processing module) 470, and a controller (CNTR; e.g., control circuitry, a control device, a control module, or a control unit) 400. The controller 400 is configured to control the light source responsive to an image recognition result provided by the image processor and may, for example, be the controller 300 of FIG. 3.

The light source 410 is for darkening of glasses, and is configured for internal mounting in the occupant space of the vehicle. The image sensor 420 is also configured for internal mounting in an occupant space of the vehicle.

The image processor 470 is configured to perform image recognition for images provided by the image sensor, wherein the image recognition is for determining whether an occupant of the vehicle wears glasses as described and exemplified above. The image processor 470 may be comprised in the controller 400 in some embodiments, and may be external to the controller 400 in some embodiments.

The system may also comprise a memory (MEM) 490 configured to store occupant user profiles, and/or an external light sensor (ELS) 480 configured for mounting at an exterior of the vehicle and configured to measure ambient light conditions.

As illustrated in FIG. 4, the controller 400 may receive inputs from the image processor IP, the memory 490, and the external light sensor 480, and may use information of such input to control the light source 410. The memory 490 may receive user profile information (for user profile creation/update) from the controller 400. Furthermore, the controller may trigger the image sensor 420 and/or the image processor 470 to perform capturing and/or image processing.

Figure 5:
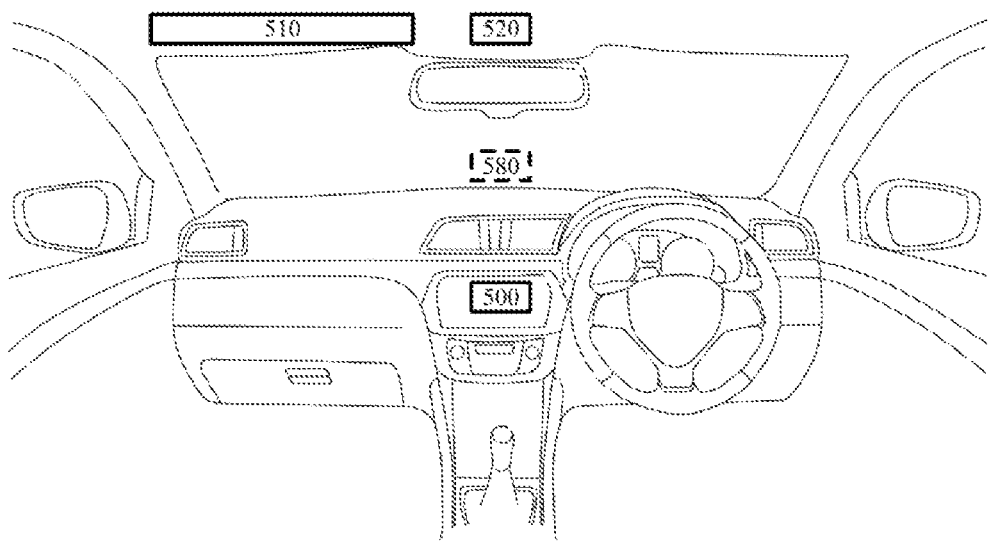
FIG. 5 is a schematic drawing illustrating an example system deployment in a vehicle according to some embodiments.
Figure 6:
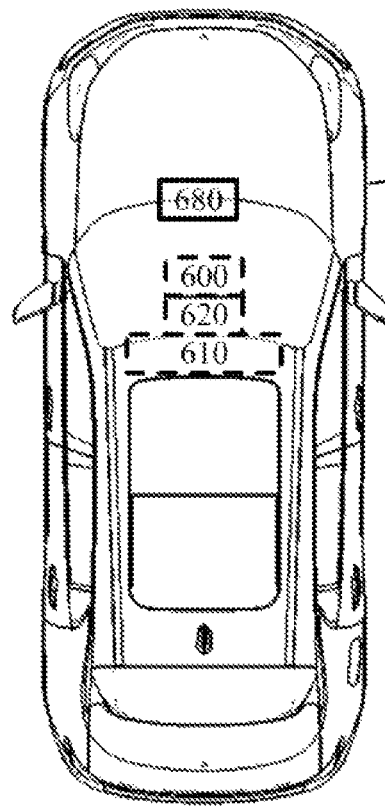
FIG. 6 is a schematic drawing illustrating an example vehicle according to some embodiments.

FIGS. 5 and 6 schematically illustrate example system deployments in a vehicle according to some embodiments. The deployment may, for example, relate to the system of FIG. 4.

The light source 410, 510, 610 for darkening of glasses is mounted internally, in the occupant space of the vehicle, and may be placed so that it emits light towards the face of a vehicle occupant when activated. For example, the light source may be placed close to the top of the windshield in front of the driver position. In some embodiments, several light sources may be used with different placements to be able to emit light towards the face of any vehicle occupant when activated.

The image sensor 420, 520, 620 is also mounted internally, in the occupant space of the vehicle, and may be placed so that it can capture the face of a vehicle occupant. For example, the image sensor may be placed close to the top of the windshield at a symmetry line of the vehicle. In some embodiments, several image sensors may be used with different placements to be able to capture the face of any vehicle occupant.

An external light sensor 480, 580, 680 is mounted at an exterior of the vehicle, and may be placed so that it can measure ambient light. For example, the external light sensor may be placed close to the bottom of the windshield at a symmetry line of the vehicle. In some embodiments, several external light sensors may be used with different placements to be able to adequately measure ambient light.

The controller 400, 500, 600, the image processor 470, and a memory 490 may be placed at any suitable position(s) in the vehicle. For example, they may be comprised in, or associated with, other data-processing devices of the vehicle.

Generally, when an arrangement or system is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as controller.

Embodiments may appear within an electronic apparatus (such as a controller) comprising arrangements, circuitry, and/or logic according to any of the embodiments described herein. Alternatively or additionally, an electronic apparatus (such as a controller) may be configured to perform methods according to any of the embodiments described herein.

Figure 7:
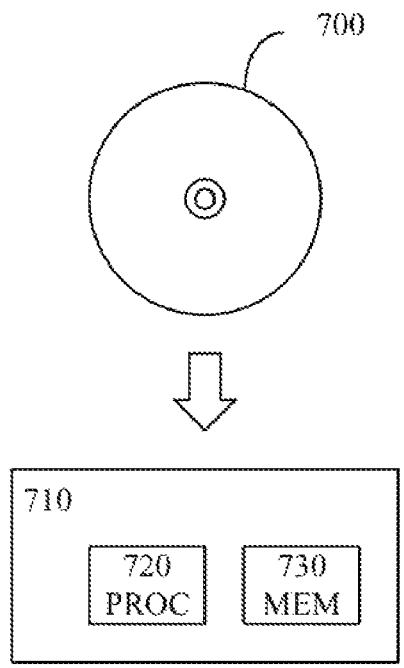
FIG. 7 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry or a data processing unit) 220, which may, for example, be comprised in a control unit 710. When loaded into the data processor, the computer program may be stored in a memory (MEM) 730 associated with or comprised in the data processor. According to some embodiments, the computer program may, when loaded into and run by the data processor, cause execution of method steps according to, for example, any of the methods illustrated in FIGS. 1-2, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A method for controlling an internal light source of a vehicle, wherein the internal light source is for darkening of photo-chromatic responsive glasses and comprises a plurality of light emitters having different wavelength profiles, the method comprising:
   acquiring an image recognition result determining that an occupant of the vehicle wears glasses and that the glasses worn by the occupant darken responsive to activation of the light source; and
   controlling the light source, responsive to the acquired image recognition result determining that the occupant wears glasses, to emit light from the light source in a wavelength so as to cause photo-chromatic darkening of the glasses worn by the occupant, wherein controlling the light source comprises selecting one light emitters of the plurality of light emitters for which the image recognition result indicates that the glasses darken responsive to activation.

2. The method of claim 1, wherein controlling the light source comprises deactivating the light source when the image recognition result indicates that the glasses do not darken responsive to activation of the light source.

3. The method of claim 1, wherein the image recognition result further indicates a darkening degree of the glasses worn by the occupant.

4. The method of claim 3, wherein controlling the light source comprises limiting an intensity of the light source to a value corresponding to a specified darkening degree.

5. The method of claim 1, wherein the image recognition is indicative of an identity of the occupant and wherein controlling the light source is based on a glasses-related user profile associated with the identity of the occupant.

6. The method of claim 1, further comprising directing the light source towards a face of the glasses-wearing occupant of the vehicle.

7. A non-transitory computer readable medium storing a computer program comprising program instructions, the computer program being loadable into a data processing unit and configured to cause execution of the method according to claim 1 when the computer program is run by the data processing unit.

8. A control unit for the internal light source of the vehicle, wherein the internal light source is for darkening of glasses, the control unit being configured to cause execution of the method according to claim 1.

9. A system for darkening of glasses in a vehicle, the system comprising:
   an image sensor configured for internal mounting in an occupant space of the vehicle;
   an image processor configured to perform image recognition for images provided by the image sensor, wherein the image recognition determines that an occupant of the vehicle wears glasses and that the glasses worn by the occupant darken responsive to activation of the light source;
   a light source for darkening of photo-chromatic responsive glasses, the light source comprising a plurality of light emitters having different wavelength profiles, and the light source being configured for internal mounting in the occupant space of the vehicle; and
   a controller configured to control the light source, responsive to an image recognition result provided by the image processor determining that the occupant wears glasses, to emit light from the light source in a wavelength so as to cause photo-chromatic darkening of the glasses worn by the occupant, wherein controlling the light source comprises selecting one light emitters of the plurality of light emitters for which the image recognition result indicates that the glasses darken responsive to activation.

10. The vehicle comprising the system of claim 9.

11. The system of claim 9, wherein the vehicle is a roadable passenger vehicle and the occupant is the driver of the roadable passenger vehicle.

* * * * *